United States Patent
Hopmann et al.

(10) Patent No.: US 6,694,335 B1
(45) Date of Patent: Feb. 17, 2004

(54) METHOD, COMPUTER READABLE MEDIUM, AND SYSTEM FOR MONITORING THE STATE OF A COLLECTION OF RESOURCES

(75) Inventors: Alexander I. Hopmann, Seattle, WA (US); Rebecca L. Anderson, Redmond, WA (US); Brian J. Deen, North Bend, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/412,739

(22) Filed: Oct. 4, 1999

(51) Int. Cl.$^7$ ............................................. G06F 17/30
(52) U.S. Cl. ......................... 707/201; 707/203; 707/6; 707/7; 709/203
(58) Field of Search ................................ 709/203, 205, 709/202, 200, 217, 223; 707/201, 203, 6, 7, 3, 101, 102, 104

(56) References Cited

U.S. PATENT DOCUMENTS

| | | | | |
|---|---|---|---|---|
| 4,631,673 A | * | 12/1986 | Haas et al. | 707/100 |
| 5,600,834 A | | 2/1997 | Howard | 395/617 |
| 5,737,601 A | | 4/1998 | Jain et al. | 395/617 |
| 5,812,773 A | | 9/1998 | Norin | 395/200.34 |
| 5,812,793 A | | 9/1998 | Shakib et al. | 395/200.31 |
| 6,202,085 B1 | * | 3/2001 | Benson et al. | 709/205 |
| 6,578,054 B1 | * | 6/2003 | Hopmann et al. | 707/201 |

OTHER PUBLICATIONS

Borenstein, et al., RFC 1521, "MIME (Multipurpose Internet Mail Extensions) Part One: Mechanisms for Specifying and Describing the Format of Internet Message Bodies," Sep. 1993.

Fielding, et al., RFC 2068, "Hypertext Transfer Protocol—HTTP/1.1," Jan. 1997.

Slein, et al., RFC 2291, "Requirements for a Distributed Authoring and Versioning Protocol For the World Wide Web," Feb. 1998.

Goland, et al., RFC 2518, "HTTP Extensions for Distributed Authoring—WEBDAV," Feb. 1999.

Fielding, et al., RFC 2616, "Hypertext Transfer Protocol—HTTP/1.1," Jun. 1999.

Yavin, D., "Replication's Fast Track," BYTE, Aug. 1995, pp. 88a–88d, 90.

Martin, J., "Design and Strategy for Distributed Data Processing," Prentice Hall, Inc., pp. 272–305, 1981.

* cited by examiner

Primary Examiner—Jean M. Corrielus
(74) Attorney, Agent, or Firm—Workman Nydegger (57) ABSTRACT

A system and method for synchronizing changes among multiple copies of data is disclosed. The system and method allows the data to be synchronized without any copying or transferring of those portions of the data that have not been changed. In particular, the system and method preferably uses an identifier to represent the current state of the data and the identifier is used to determine what, if any, changes have occurred to the data. Thus, instead of comparing the data itself to see if changes have been made, the identifier is used to simply and easily determine if changes were made to the data. Each identifier preferably includes a first portion that identifies a particular source for the data and a second portion that includes a change number that is changed each time the underlying resource is modified. The identifier is preferably opaque or transparent to the client such that the client does not have to understand anything about the format or use of the identifier. Advantageously, an opaque identifier allows the system and method to be compatible with a wide range of data and programs.

38 Claims, 6 Drawing Sheets

METHOD, COMPUTER READABLE MEDIUM, AND SYSTEM FOR MONITORING THE STATE OF A COLLECTION OF RESOURCES

BACKGROUND OF THE INVENTION

1. Field of the Invention

The present invention generally relates to synchronization of data. More specifically, the present invention relates to systems and methods that allow two or more copies of data to be synchronized so that changes made to one copy of the data can be identified, transferred and incorporated into the other copies of the data, while minimizing the processing and data transfer needed to accomplish the synchronization.

2. Description of Related Art

Computers are an important tool that allows individuals in many locations to access information at almost any time. In addition, computers can be used to perform a variety of tasks including communicating, calculating, documents handling, storing and retrieving information, imaging and entertaining. Significantly, computers can allow multiple parties to access and share information, and this is becoming increasingly vital to businesses and individuals. For example, information is often stored on a network to allow multiple users access to the same information. Access to the network is frequently provided by local area networks (LANs) at the office, or by modems when at home or traveling or other Internet connections.

With the increasing accessibility and sharing of information between multiple users, it is now more common than ever for multiple users to simultaneously or in tandem work on shared data objects such as word processing documents, spread sheets, electronic forms, electronic mail messages (E-mail), graphic images, or a variety of other such data objects. Because of the shared use of these data objects among multiple users, there arises a need for each user to keep all other users of the same data objects or the same set of data objects apprised of changes that are made locally by that user. Thus, all copies of the same data objects should be updated so that each user has access to the most current version. This process of updating the data objects is called synchronization and it includes transferring incremental changes (e.g., creation of new data objects, modification of existing data objects, or deletion of existing data objects) made at one location to one or more other locations so that each copy of the data objects is the same.

Conventional computer systems often include a network or enterprise of remote or locally connected servers, and each server includes a copy of the data objects or sets of data objects. The user may then access a copy of one or more of the shared data objects or sets of data objects stored on a server in order to gain access to the desired information. In particular, these conventional computer systems allow a user to make copies of the desired data objects or sets of data objects, and store those objects on a local computer such as a personal or lap top computer. The local computer could then be accessed and used when it was not connected to the network (i.e., the local computer is "logged off" the network). This allows the local computer to be used in any desired location, and the data objects could be used, modified, changed or deleted as desired by the user while the local computer was not connected to the network. For example, the user can read, move and delete E-mail messages on the local computer, and the network can simultaneously receive new E-mails or existing E-mails can be read, deleted or changed by other users. The local computer, however, will not be aware of the changes on the network, and the network will not be aware of the changes on the local computer, until the data is synchronized.

Conventional systems often synchronized the local computer and network by transferring entire sets of data from the data source to the data recipient. In particular, these known systems updated the data objects by copying the entire contents of the file with the data objects between the local computer and the server. Thus, for example, if the user was updating the calendar or E-mail programs, the entire contents of the calendar or E-mail file were often duplicated and transmitted because the system did not know which items were changed or modified. Disadvantageously, transferring the entire file is time consuming and inefficient because information that has not been changed is copied and transferred between the client to the server. Alternatively, the user had to manually identify the new or modified information so that these files could be updated to the computer or network. Disadvantageously, this required additional time and effort by the computer user and if many files were modified, this was often a tedious process.

Conventional systems also used the date and time stamp in an attempt to synchronize data objects stored in the local computer and on the network. In particular, the date and time that the local computer was disconnected from a network server was saved by the server. When the local computer was once again connected, the server would ask for all changes that occurred since the last time it was connected. Disadvantageously, this known system does not work well where copies of the data objects have to be copied from one server to another server. For example, when two or more servers are connected together, information is shared and transferred between the servers at predetermined intervals such as every 15 minutes. Accordingly, if the local computer was last connected to the network server at 11:30 a.m. and is currently reconnecting to the same network server at noon, then that server can ask the local computer for all changes that occurred since 11:30 a.m. Suppose the local computer disconnects at 12:05 p.m. and at 12:10 p.m. a change is received by the first server from a second server that occurred at 11:55 a.m. When the local computer reconnects to the first server, it will ask for changes that occurred after 12:05 p.m. and the 11:55 a.m. change will never be retrieved. Another drawback of this conventional system is it may not be able to retrieve all changes that previously occurred if the user connects to a different server. Thus, the user typically has to reconnect to the same server each time. Furthermore, this system is susceptible to problems caused by time changes and other related difficulties.

SUMMARY OF THE INVENTION

A need therefore exists for a system and method for synchronizing two or more copies of data that eliminates the above-described disadvantages and problems.

One aspect of the present invention is a system and method for synchronizing two or more copies of data. Preferably, the system and method synchronize incremental changes to the data such that each copy of the data is up-to-date. In particular, the system and method allows shared copies of the data between a mobile or local computer system and a computer network or server so that both the local computer and the server contain symmetrical, up-to-date copies of the data. Advantageously, the system and method provide multiple parties access to the same current data, and the data can be quickly and efficiently synchronized because only the changed data is updated.

Another aspect of the present invention is a generalized synchronization system and method that can be used with a wide variety of applications and programs. For example, the system and method may be used with any suitable data, data objects, databases, folders, systems, programs and the like. Additionally, the system and method can readily synchronize data between a client or local computer system, such as a laptop or portable computer, and a network including one or more servers. It will be appreciated that the term "client system" may refer to any system that desires to synchronize data with the network. It will also be appreciated that this synchronization can be performed over any suitable communication lines such as a data link, local area network (LAN), modem, etc.

Yet another aspect of the present invention is a system and method that allows data to be synchronized between two different machines, without copying or transferring data or even manifest that has not been changed. Preferably, the system and method allows data to be synchronized between a server machine and a client machine such that both have the most up-to-date data. The client machine may comprises any suitable machine such as a personal computer, portable computer, notebook computer, lap top computer, palm computer, embedded computer, personal data assistant (PDA), or the like. The server machine may comprise any suitable server or computer that can support HTTP and/or WebDAV protocols, and the server machine can be part of a network that includes other servers, computers, storage devices or other known devices. For simplicity, the client machine may be referred to as the client and the server machine maybe referred to as the server.

Advantageously, the system and method allows the same client to be connected to the same server, or the same client can be connected to different servers because the data is replicated among the servers. This allows the client to synchronize with any server and symmetrical information between the client and the server can be obtained. Thus, a client can be synchronized with any server from an arbitrary set of servers that have the same information replicated. Additionally, it will be understood that the system and method can be used with any number of clients and servers in any desired configuration.

Still another aspect of the present invention is a system and method that allows data to be readily synchronized between the client and the server so that both the client and the server have symmetrical, up-to-date data. Significantly, the client can be disconnected (i.e., "off line") from the server and still have access to its data, and then the client can be reconnected to the server (i.e., "on line") and the data in both the server and the client are synchronized to the most current information. Therefore, neither the server nor the client will have out-of-date data that may inadvertently be accessed. Additionally, if new data is added, this new data will also be updated such that both the server and the client have symmetrical data. Significantly, because only the modified data is communicated between the client and the server, the synchronization process is very rapid.

Yet another aspect of the present invention is a system and method that uses an identifier to represent the state of the contents of a collection. Preferably, the identifier contains information about the state of a resource in the collection at a particular time, and this information is used to determine what, if any, changes occurred to that resource. Thus, instead of comparing the resources themselves to see if a change was made, the identifier can be used to simply and easily determine if a change was made to the resource.

Still another aspect of the present invention is a system and method that uses identifiers to determine if changes were made to one or more resources. Desirably, a different identifier is used to identify each relevant resource stored in the computer. Each identifier preferably includes a first portion that corresponds to a particular server and a second portion that includes a change number that is changed each time the underlying resource is modified. Advantageously, the identifier can be quickly and easily transferred between the server and the client because it is a small data stream. Significantly, time and resources are saved because only those resources that were changed are updated, and any resources that were unchanged are not updated, copied or transferred.

Another aspect of the present invention is a system and method that uses an identifier that is opaque or transparent to the client when synchronizing two or more copies of data between the client and a server. Because the identifier is opaque, the client does not have to use, create or manage the identifier. Additionally, the client does not have to understand anything about the format of the identifier because it merely stores and transmits the identifier. Further, the server can change the format of the identifier at any time—for example, to upgrade or change the server and this does not have any effect on the client because the identifier is opaque to the client. Advantageously, the opaque identifier allows the system and method to be compatible with a wide range of data and programs.

In yet another aspect of the present invention, the system and method includes sending a synchronization request along with a manifest from a local computer to a server. If this is the first time that the computer is synchronized, the manifest contains no information. Otherwise, the manifest contains information that indicates the current state of the resources stored at the local computer. In response, the server generates a new manifest that indicates the current state of the resources stored on the server. The server uses these manifests to determine if the resources need to be synchronized. The server then returns the new manifest to the client along with a copy of the resources to be synchronized.

One feature of the present invention is method of synchronizing two or more copies of data between two or more components, wherein one copy of the data is stored in a first component and another copy of the data is stored in a second component. The method includes the steps of generating a synchronization request, the synchronization request including an identifier which identifies the state of a collection of resources in the first component; communicating the synchronization request from the first component to the second component; generating an identifier for the second component which identifies the state of a collection of resources in the second component; and comparing the identifier for the first component with the identifier for the second component to determine specifically which resources are different from the resource in the first component.

Another feature of the present invention is a method of synchronizing two or more copies of data, one copy of the data is stored on a first machine and another copy of the data is stored on a second machine. The method includes generating a synchronization request at the first machine, the synchronization request including a first identifier that indicates the state of a collection of data at the first machine; communicating the synchronization request to the second machine; comparing the first identifier with a second identifier that indicates the state of a collection of data at the second machine to determine incremental changes between the data stored on the first machine and the data stored on the second machine; and transmitting only the incremental changes in the data between the first machine and the second machine so that the copies of the data are synchronized.

Still another feature of the present invention is a method of synchronizing two or more copies of data, one copy of the data being stored on a first machine and another copy of the data being stored on a second machine. The method includes transmitting a synchronization request from the first machine to the second machine, the synchronization request including a first manifest indicating the state of the data stored on the first machine; receiving the synchronization request and the first manifest at the second machine; comparing the first manifest with a second manifest indicating the state of the data stored on the second machine; identifying incremental changes in the copies of the data on the first machine and the second machine from the comparison of the first manifest and the second manifest; and communicating copies of the incremental changes between the first and second machines such that the copies of the data are synchronized A further feature of the present invention is a method of synchronizing two or more copies of data, one copy of the data being stored on a first machine and another copy of the data being stored on a second machine. The method comprising the steps of communicating a synchronization request from the first machine to the second machine; comparing a first identifier that represents data stored on the first machine with a second identifier that represents data stored on the second machine to determine if the data needs to be synchronized; and communicating only the data the needs to be synchronized from the second machine to the first machine.

Yet another feature of the present invention is a method of synchronizing a second set of data with a first set of data that has had incremental changes made thereto. The incremental changes are made only to the first set of data and not the second set of data. The method comprising the steps of comparing a first manifest that indicates a current state of the first set of data with a second manifest that indicates a current state of the second set of data; determining the incremental changes in the first set of data that need to be synchronized with the second set of data based on the comparison of the first manifest and the second manifest; and communicating only those incremental changes in the first set of data with the second set of data so that the first set of data and the second set of data are synchronized.

Still another feature of the present invention is a computer-readable medium having computer-executable instructions for performing steps. The steps comprise communicating a synchronization request from a first machine to a second machine; receiving the synchronization request at the second machine; calculating a manifest that indicates the current state of a collection of resources in the second machine; comparing the manifest for the second machine with a manifest for the first machine, the manifest for the first machine indicating the current state of a collection of resources in the first machine; identifying incremental differences between the collection of the resources in the first machine and the second machine based upon the differences between the manifests: and communicating the incremental differences in the collection of resources between the second machine and the first machine so that the collection of resources in the first machine is synchronized with the collection of resources in the second machine.

Another feature of the present invention is a computer-readable medium having computer-executable instructions for performing steps. The steps comprise communicating a synchronization request from a first machine to a second machine, the synchronization request including a manifest indicating the current state of a collection of resources stored at the first machine; calculating a manifest indicating the current state of a collection of resources stored at the second machine; comparing the manifest for the first machine with the manifest for the second machine; determining the resources that need to be copied from the first machine and the second machine based on the comparison of the manifests; and communicating only those resources which need to be synchronized between the first machine and the second machine.

A further feature of the present invention is a method of synchronizing resources between a client machine and a server machine, wherein only resources that contain incremental changes are synchronized and resources than are unchanged are not synchronized. The method comprising the steps of connecting the client machine to the server to allow communication between the client machine and the server machine; copying appropriate resources from the server machine to the client machine; disconnecting the client machine from the server machine; reconnecting the client machine to the server machine; and synchronizing only the incremental changes to the resources between the client machine and the server machine.

Yet another feature of the present invention is a method of synchronizing a second copy of data with a first copy of the data. The first copy of the data includes incremental changes that have not been incorporated into the second copy of the data. The method comprises calculating a first identifier for the first copy of the data, the first identifier indicating the contents of the first copy of the data; calculating a second identifier for the second copy of the data, the second identifier indicating the contents of the second copy of the data; comparing the first identifier and the second identifier for controlling transfer of the incremental changes from the first copy of the data to the second copy of the data; and synchronizing the incremental changes from the first copy of the data to the second copy of the data.

Yet another feature of the present invention is a computer-readable medium having computer-executable instructions for performing steps. The steps comprise means for identifying the contents of a first collection of resources; means for identifying the contents of a second collection of resources; means for comparing the contents of the second collection of resources with the first collection of resources to determine incremental changes between the first and second collection of resources: and synchronizing the incremental changes between the first and second collection of resources.

A further feature of the present invention is a system for synchronizing a second copy of data located in second component with a first copy of the data located in a first component. The first copy of the data includes incremental changes that have not been incorporated into the second copy of the data. The system comprises a data transferring system and the data transferring systems comprises means for identifying the contents of a first collection of resources; means for identifying the contents of a second collection of resources; and means for comparing the contents of the second collection of resources with the first collection of resources to determine incremental changes between the first and second collection of resources; and means for synchronizing the incremental changes between the first and second collection of resources.

A benefit of the system and method for synchronizing copies of data is it saves time and computer resources because new or changed data is communicated only once between the server and the client. Thus, there are no multiple transfers of common data. Another benefit is the system and method can be used in diverse applications, including on different platforms, and it can be implemented on a wide variety of machines. Significantly, because it preferably uses standard HTTP and/or WebDAV protocols, this further increases its ease of use and availability for a wide variety of applications. Advantageously, because the system and method can be used with standard protocols such as HTTP, this provides general support for operation over the Internet, support for firewalls and the easy availability of code libraries that support it (including, for example, XML).

Another benefit is the synchronization of the data copies may take place automatically or when indicated by the user. For example, the system and method may be configured to automatically synchronize the information whenever the client is disconnecting from or connecting to the server. The system may also be configured to automatically synchronize the data after a predetermined time or at a user selected internal when the client is connected to the server. Alternatively, the user may manually select when the data is to be synchronized. Yet another benefit is not all the data has to be synchronized at one time. Instead, a first portion of the data may be synchronized first and a second portion of the data may be synchronized at a later date.

Further aspects, features and advantages of the present invention will become apparent from the detailed description of the preferred embodiments that follows.

BRIEF DESCRIPTION OF THE DRAWINGS

The appended drawings contain figures of preferred embodiments of the present system and method of monitoring the state of a collection of resources. In order that the manner in which the above recited and other aspects, features and advantages of the invention are obtained, a more particular description of the invention will be rendered in connection with the preferred embodiments. Understanding that these drawings depict only preferred embodiments of the invention and are not to be considered limiting of its scope, the invention will be described and explained with additional specificity and detail through the use of the accompanying drawings in which.

DETAILED DESCRIPTION OF THE PREFERRED EMBODIMENTS

The present invention involves a system and method for monitoring the state of a collection of resources, and synchronizing copies of the collection of resources. The principles of the present invention, however, are not limited to monitoring and synchronizing a collection of resources. It will be understood that, in light of the present disclosure, the invention disclosed herein can be successfully used in connection with updating changes to a wide variety of different types of data and information.

Additionally, the system and method is described by using flow diagrams to illustrate either the structure or processing of embodiments used to implement the system and method. Using the diagrams in this manner to present the invention should not be construed as limiting of its scope. Further, embodiments of the system and method may include a special purpose or general purpose computer including standard computer hardware such as a central processing unit (CPU) or other processing means for executing computer executable instructions, computer-readable media for storing executable instructions, a display or other output means for displaying or outputting information, a keyboard or other input means for inputting information, and so forth.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
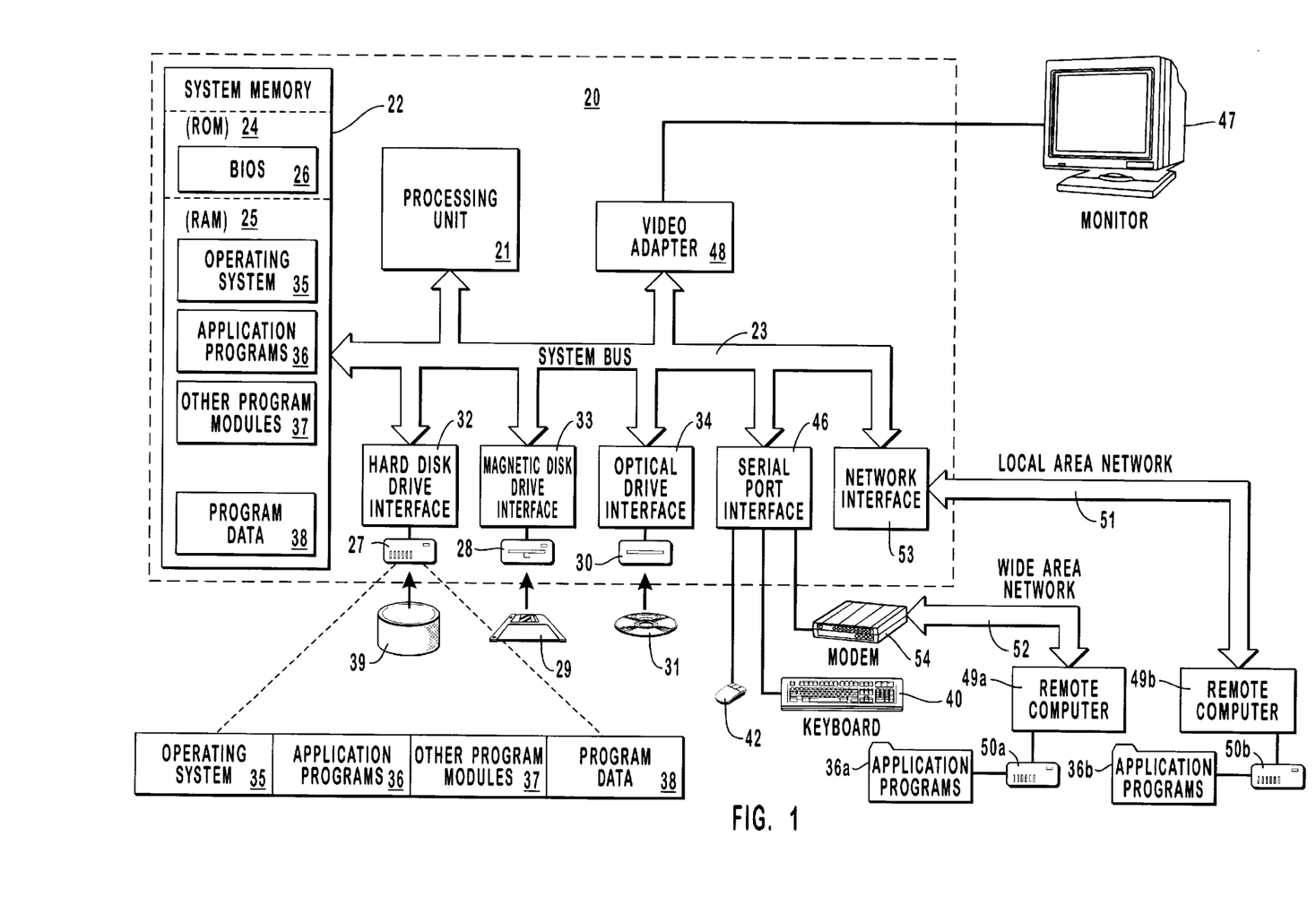
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
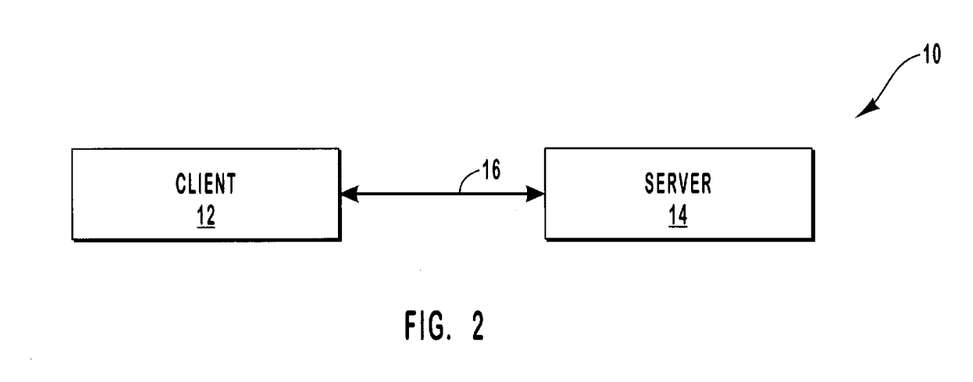
FIG. 2 is a diagram illustrating an exemplary client machine and an exemplary server machine.

As seen in FIG. 2, an exemplary system is generally shown at 10 and it includes a client machine 12 and a server machine 14 that are linked together to allow communication in a desired manner. The client 12 is preferably a local computer such as a personal computer, portable computer, lap top computer, notebook computer, palm computer, personal data assistant (PDA) and the like. The server 14 can be any type of machine that is used for receiving client requests for data and sending out results, storing information, etc., including any type of general or specialized computer such as a server, personal computer, portable computer, lap top computer, notebook computer, palm computer or other computer. The server 14 can be connected with other servers, computers, storage devices, networks, and the like, if desired. The client 12 can upload or communicate information or data to the server 14 through a communication link 16, and the server can download information or data to the client through the communication link according to various procedures known to those of ordinary skill in the art. Although the present invention can be used to monitor a variety of resources and to synchronize copies of data in any context, monitoring data at a client 12 and/or server 14 and synchronizing this data provides a convenient context to illustrate the system 10.

The server 14 is preferably configured to be used with standard computer protocols such as HTTP and WebDAV, but this system 10 could be used in connection with other suitable protocols and systems. HTTP and WebDAV protocols are well known to those of ordinary skill in the art, and information about these protocols is widely available. For example, these protocols are described in detail in the Internet Requests for Comments (RFC) documents, which are documents that include written definitions of the protocols and policies of the Internet. These documents are available, for instance, from the Computer and Information Science Department of the Ohio State University (web site address cis.ohio-state.edu). In particular, information about WebDAV is provided in RFC 2518, entitled HTTP Extensions for Distributed Authoring, and information about HTTP is found in RFC 2068 and RFC 2616, which are both entitled Hypertext Transfer Protocol—HTTP/1.1. These documents are hereby incorporated by reference in their entirety.

Figure 3:
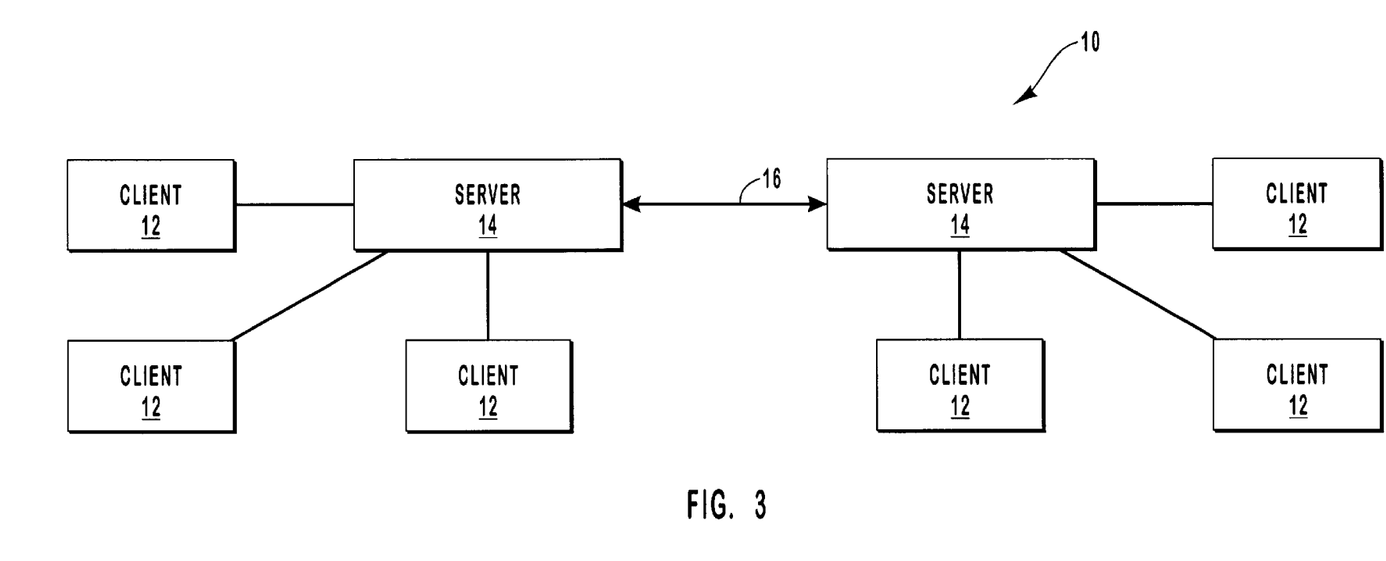
FIG. 3 is a diagram illustrating a plurality of exemplary client machines and a plurality of exemplary server machines.

As shown in FIG. 3, the system 10 can also include a plurality of servers 14 that are connected together by one or more communication links 16. Thus, each server 14 may have one or more peers, and each server may be considered to be a component of the system 10. The servers 14 may be interconnected in any desired manner and may have shared copies of information or data sets. In particular, the servers 14 are preferably automatically updated according to known procedures and protocols to maintain updated copies of the data sets in each server. Thus, each server 14 desirably contains a replica of the same data set as the other servers.

The system 10 can also include one or more clients 12 that are connected to one or more servers 14 in any desired manner to allow communication between the clients and the servers. Significantly, any client 12 can be connected to any server 14 at any time and because each server contains a replica of the same data sets, each server can provide the same data to the client. That is, the client 12 can connect to any server 14 and obtain the same data because each server contains a copy of the same data sets. Advantageously, as shown in FIG. 3, a plurality of clients 12 may be connected to one or more of the servers 14. Thus, the clients 12 form a plurality of individual nodes or components that are in communication with the various servers 14. In a typical system 10, there will be many more clients 12 than servers 14, but it will be appreciated that there may be any suitable combination of clients and servers.

The system 10, which is described in greater detail below, advantageously allows symmetric storage of information or data between the client 12 and the server 14. That is, data stored at the client 12 and the server 14 is synchronized such that one or more users have access to the most up-to-date information. For example, to illustrate a preferred embodiment of the present invention, the client 12 may comprise a portable computer, such as a notebook computer, that is intermittently connected via a modem or network interface card to a network including one or more servers 14. The client 12 may download appropriate information from the server 14 so that the client has a local copy of the data. The client 12 may then disconnect or "log off" the server 14, which has a corresponding copy of the data, for instance to travel on an airplane. During the airplane flight, the user can make modifications to the local copy of the data while the client 12 is not connected to the server 14. For instance, the client 12 may read, create, modify, send or delete E-mail messages. Simultaneously, changes can be made to the data stored on the server 14, such as receiving new E-mail messages or modifying existing E-mail messages. After the airplane flight, the client 12 can then be reconnected to a server 14 and the data is synchronized such that both the client and the server have the most up-to-date information. That is, the E-mails read, created, modified, sent or deleted on the client's notebook computer are similarly updated on the server, and the new or modified E-mail messages on the server are transmitted to the client. Significantly, in this example, the system 10 only updates or synchronizes the new or changed E-mail messages, and all other data is not disturbed in any manner.

In greater detail, the system 10 allows for synchronizing incremental changes to two or more copies of data wherein at least one copy of the data is stored at the client 12 and at least one copy is stored at the server 14. These incremental changes may include creation of new data, modification of existing data, and deletion of existing data. The data may contain specific information such as word processing documents, calendar or scheduling information, E-mail, spreadsheets, or any other suitable types of information, folders, or directories. This data is preferably stored in the local database or store of the client 12 and the server 14 contains a copy of this same data. This data can be changed or modified in various ways as known to those of ordinary skill in the art. Significantly, the system 10 allows the information in the server 14 and client 12 to be synchronized such that the client always has the most up-to-date information. Advantageously, only the new or changed data is synchronized and the unchanged information is not transmitted between the client and the server. Thus, this saves time and system resources because less information is transferred between the client and the server, and it decreases the amount of traffic or information being transferred between the client and the server.

Figure 4:
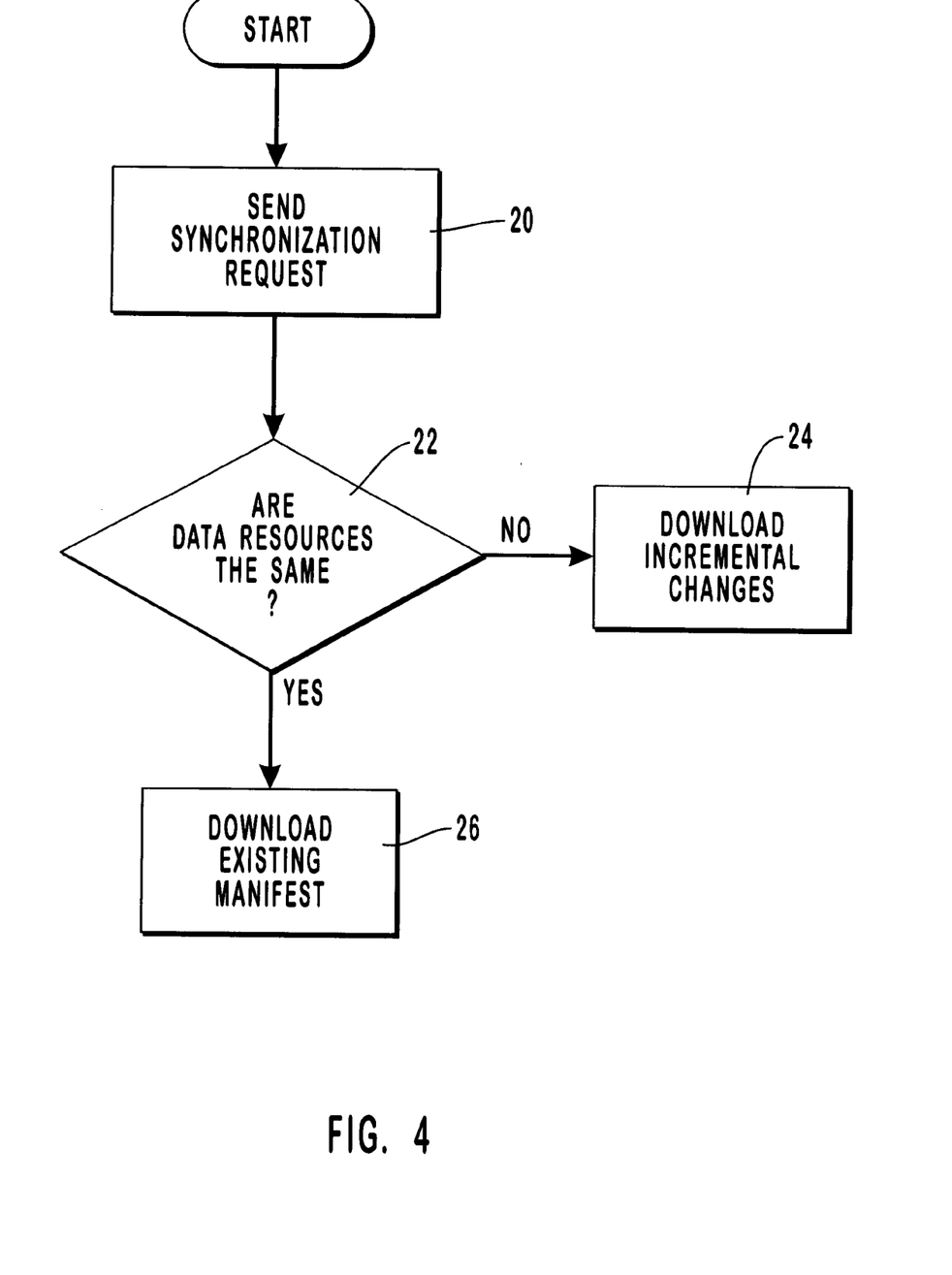
FIG. 4 is a flow diagram in accordance with a preferred embodiment of the present invention.

An overview of a preferred embodiment of the system 10 is included in FIG. 4. In this exemplary embodiment, the client prepares and sends to the server a synchronization request command 20. Included with this synchronization request is a manifest that includes an identification of the resources currently stored at the client. The term resource is broadly used to refer to any suitable data, data objects, databases, folders, systems, programs, etc. that may be stored at the client. The server receives the synchronization request command and the manifest from the client. The server uses this manifest to determine if the resources at the client are the same as the resources at the server 22. If these resources are not the same, the server downloads the new or modified resources to the client. Significantly, any data that is not new or modified is not downloaded to the client. On the other hand, if the resources at the client and the server are the same, then the same identifier is returned to the client 26 and no data is downloaded. Thus, the existing data at the client is not copied, replaced or modified unless it is being synchronized with the data of the server. It will be appreciated that the system may also be configured to allow downloading or uploading of resources from the client to the server.

Advantageously, the data can be synchronized at any desired time because the client sends the synchronization request command to the server. For example, the user may choose to manually update the data at any desired time. Alternatively, the system may automatically update the data, such as each time the client 12 is connected or disconnected from the server 14, or at specified time intervals while connected to the server. It will be appreciated that the system 10 could also be configured such that the server determines when the data will be synchronized, or the server may prepare and send the request for synchronization.

Additionally, the system 10 may be configured to allow the user to determine what information should be synchronized. For example, the user may only desire to synchronize files of certain sizes, E-mails sent directly to the client, E-mails from a particular sender, etc. Thus, the system 10 preferably includes a feature that allows the user to specify what data should be synchronized. It will be appreciated that the system could also synchronize all data and/or programs between the client 12 and the server 14. Of course, the system could be arranged in many desired configurations and with a variety of different features.

Once the information is being synchronized, there may be a conflict between one or more of the items. For example, the client may have changed one of the items while disconnected from the server. Additionally, the same item may have been changed at the server by the user or a third party. Thus, the same item has been changed both at the client and at the server. In order to resolve this conflict, the server preferably determines if the same changes were made at both the client and the server. If so, then there is no conflict and the data does not need to be synchronized. On the other hand, if the client and server have different changes, then the server can automatically solve this conflict, or inform the user of the conflict and have the client resolve this conflict. This conflict resolution is discussed in more detail in co-pending application entitled Systems and Methods for Detecting and Resolving Resource Conflicts, U.S. patent application Ser. No. 09/412,738, filed on Oct. 4, 1999, and assigned to the same assignee as the present application. This co-pending application is hereby incorporated by reference in its entirety.

As discussed above, the identifier represents the current state of the resources stored at the client. In greater detail, an identifier is preferably associated with each resource, and these resources could be any types of data, files, information, documents, etc. For example, the client may initially contain resources R1, R3 and R6, but the server contains resources R1, R2, R3, R4, R5 and R6. When the client desires to synchronize the resources of the client and the server, the client sends both a synchronization request command and the manifest to the server. The manifest includes a list of the identifiers and, as discussed above, the identifiers indicate the current state of resources existing at the client. Therefore, in this example, the manifest sent by the client to the server is R1, R3, R6. The server then determines the manifest for the server, which is R1–R6. Because the server knows the identification of the resources currently existing at the server and at the client, the server determines that the client needs to be updated with resources R2, R4 and R5. Consequently, copies of the resources R2, R4 and R5 are downloaded to the client and a new manifest R1–R6 is also downloaded to the client. The manifest desirably includes ranges of identifiers rather than multiple discrete data points or sets of data points because ranges require less space and information to transmit. Significantly, these manifests and identifiers reduce or minimize the processing overhead needed to accomplish the synchronization.

The identifier is preferably opaque or transparent to the client so that the client does not have to use, create or manage the identifier. Additionally, the client does not have to understand anything about the format of the identifier because it merely stores and transmits the identifier. Thus, the opaque identifier minimizes the burden on the client during the synchronization process.

In greater detail, the identifier is preferably Base 64 encoded. Base 64 encoding is known to those skilled in the art and information regarding Base 64 encoding is widely available. For example, Base 64 encoding is discussed at length in RFC 1521, entitled Mechanisms for Specifying and Describing the Format of Internet Message Bodies, which is hereby incorporated by reference in its entirety.

In order to more fully illustrate the system, another example, in the context of an E-mail program, is provided. Of course, it will be understood that any type of system or application that involves documents, records, or various types of data such as a calendar or word processing program may be used. Additionally, the user may have anywhere from zero to hundreds of E-mails depending, for example, upon the size and capacity of the E-mail system. As known to those skilled in the art, the user can read, respond, delete, select and sort E-mails into various categories or properties such as size, sender, subject, date, etc. If the client is connected to the server (i.e., on line), data requests go directly to the server and the information is simultaneously updated at both the client and the server.

In this example, the user has received ten (10) E-mail messages that are identified as Mail 1, Mail 2, . . . Mail 10. Each of these E-mail messages is given a unique identifier and each identifier includes at least two different portions. The first portion of the identifier includes an identification of the server that initially received the E-mail message and the second portion includes a change number. Accordingly, if the E-mail was originally received by server "A," for example, the server identification could simply be "A." The change numbers are preferably sequential, generally continuous numbers that increase in predetermined increments such as 1, 2, 3, . . . but the change numbers may comprise any suitable numbers, symbols, characters or indicia in any desired pattern or arrangement. These change numbers are used to identify when a resource has changed, such as a change in a property or subject matter of the resource. Thus, each E-mail message is assigned an initial change number and if the E-mail message is subsequently modified, then a new change number is assigned to the E-mail message. Preferably, the change numbers start at some predetermined point, such as the number 1, and the next available change number is assigned to each new or modified E-mail message to create a new identifier for that modified message. Additionally, the server preferably has a predetermined method for changing the change numbers and one or more of the change numbers may be reserved for specific users or uses.

Accordingly, in this example, the ten E-mail messages Mail 1, Mail 2, . . . , Mail 10 are assigned identifiers A1, A2, . . . A10, respectively, wherein the "A" refers to server A and the numerals refer to the change numbers. Therefore, the manifest for these ten E-mails is A1–A10. It will be appreciated that the letters and numbers used in these examples are for simplicity and convenience, and any type of characters or data may be used to create the identifiers.

Figure 5:
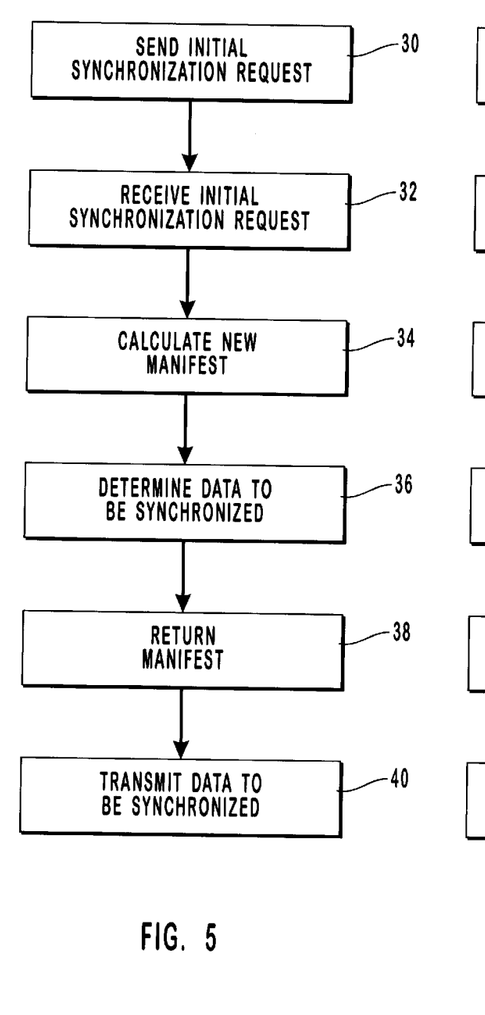
FIG. 5 is a flow diagram in accordance with another preferred embodiment of the present invention.

Suppose the user logs onto the network and copies the ten E-mail messages (A1–A10) onto the client's system such as a notebook computer. The user then logs off the network and, while logged off the network, the user may read, modify or delete the ten E-mail messages as desired. As shown in FIG. 5, the user then, for the first time, connects to the server and sends an initial synchronization request command to the server 30. The synchronization request command may include traditional HTTP or WebDAV commands such as PROPFIND or SEARCH to acquire not only a list of the resources that need to be synchronized by the client, but also any specific properties that the client desires. This operation can be accomplished in a single download operation in order to reduce network traffic. The synchronization request command also includes a manifest, but in this case the manifest is empty because the server has no information about the current state of the client's data. That is, the content of the manifest is empty because this is the first time that the client has requested synchronization of the data. The server receives the initial synchronization request command and the empty manifest 32. The server determines that this is the initial synchronization request from the client because the identifier is empty. The empty identifier means that the client does not have current copies of any of the resources in the collection, so the server's manifest of items will include all the resources in the collection. The server then returns the new manifest A1–A10 to the client 38 and any data that needs to be synchronized is communicated to the client 40.

Figure 6:
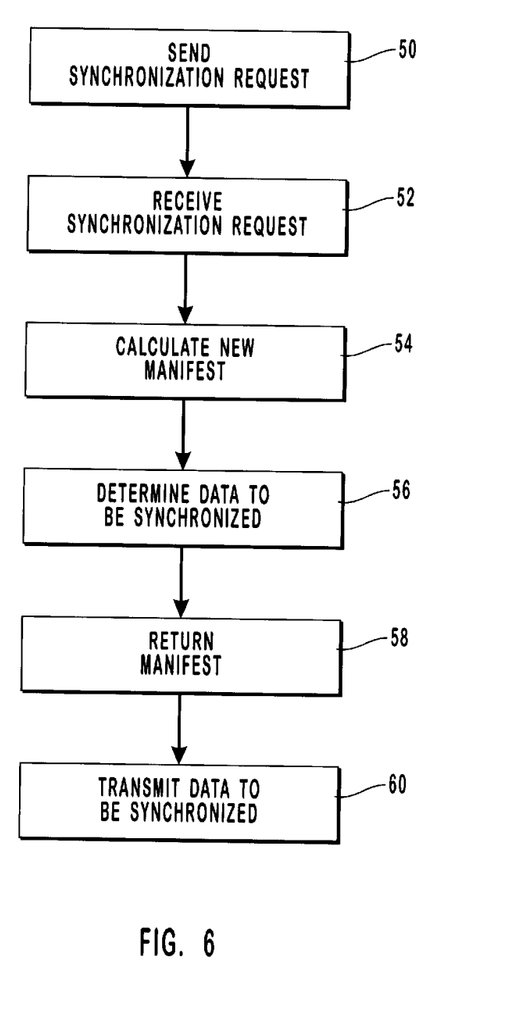
FIG. 6 is a flow diagram in accordance with yet another preferred embodiment of the present invention.

In this example, suppose the client is once again disconnected from the server and during this time a new E-mail message (Mail 11) arrives at the server A. This new E-mail message Mail 11 is identified by the identifier A11. As shown in FIG. 6, when the client reconnects to the server and desires to synchronize the systems, the client sends a synchronize request command and the previous manifest A1–A10 to the server 50. The server receives the synchronization request command and existing manifest 52, calculates a new manifest 54 which is A1–A11, and then identifies Mail 11 (A11) as an E-mail message that the client does not have 54. The server calculates what data needs to be synchronized by determining the difference between the new manifest A1–A11 and the prior manifest A1–A10. Thus, the server then transmits only E-mail Mail 11 (A11) to the client along with a new manifest A1–A11. Therefore, the client receives the data necessary for synchronization and the new manifest 60, and it is now synchronized with the server. Significantly, the identifiers do not contain any information regarding the properties or contents of the resources and, instead, the identifiers simply indicate the current state of the resource. Accordingly, no comparison of the subject matter or other properties of the resources is necessary to determine which E-mails need to be synchronized. Consequently, there is no transferring or copying of any E-mail messages that were not changed.

Suppose the client is once again disconnected from the server and during this time the original E-mail message Mail 2 (A2) was modified. This modified E-mail message is assigned the next change number, which is 12, and a corresponding new identifier A12 is established. Subsequently, a new E-mail message arrives at server A, Mail 12, and it is assigned an identifier A13 because "A" represents the server which originally received the E-mail message and "13" is the next change number. When the client reconnects to the server and desires to synchronize, the previous manifest A1–A11 is sent to the server and the server determines that the client does not have E-mail messages corresponding to identifiers A12 or A13. More specifically, the server generates a new manifest A1–A13 and compares it with the old manifest A1–A11 to determine that mail messages corresponding to A12 and A13 need to be synchronized. Alternatively, for example, the server could compare the set of resources currently existing at the server with the set of resources that currently exist at the client. The server then sends modified E-mail message Mail 2 (A12) and new mail message Mail 12 (A13) to the client along with a new manifest A1–A13. The client would need to recognize that A12 is an update to Mail 2, and replace its current data for Mail 2 (recall that the client saved data A2) with the updated data (A12) from the server. A client can recognize changes to already-stored resource by comparing names, URLs, resource UIDs, or any other property that the client uses to identify different resources.

Advantageously, the manifest requires very little time and space to store, transmit and receive because it preferably includes ranges of identifiers instead of lists of individual identifiers. For example, the manifest may include ranges such as A1–A10, B50–B100, C10–50. Additionally, transmitting a range of identifiers in the manifest is less time consuming and complex than deleting old E-mail identifiers, such as A2, and sending a longer data stream such as A1, A3–13, or sending a list of the individual identifiers. Thus, the ranges save time and space, but the manifest could also include individual identifiers, or a combination of individual identifiers and ranges of identifiers. It will be appreciated, however, that the identifiers and manifests can have any suitable configuration and arrangement.

Additionally, as previously discussed, the client can be connected to any server because each server contains a replica of the same information contained on server A. In this example, therefore, server B would have the same manifest A1–A13 that is stored at server A. Accordingly, if the client is now connected to server B and a synchronization command request was sent by the client to server B, server B would know that no information needs to be updated because the manifest sent by the client (A1–A13) would match the manifest at server B. However, for example, if mail message Mail 5 (A5) was modified and saved on server B during the time the client was disconnected from any server, modified mail message Mail 5 would have a new server identifier and a new change number. In this case, the identifier would include the server identifier "B" and the initial change number "1." Thus, the identifier for modified mail message Mail 5 is B1.

Consequently, when the user connects to either server A or server B and the client sends a synchronization request command and a manifest of A1–A13 to the server, the server has a manifest of A1–A13, B1. Thus, the server determines that the modified mail message Mail 5 (B1) and the new manifest (A1–A13, B1) should be sent to the client. The reason that the server identifier is used with the change number is to ensure that the same identifier is not reused or repeated. Thus, each server sequentially identifies each resource or modification of a resource by both the change number and the server identification. This prevents two identifiers from referring to the same resource. Advantageously, the unique identifiers allow the client to connect to any server and to quickly and efficiently synchronize the resources at the client and the server. This increases reliability and dependability of the system, for example, if a server is being maintained or replaced.

Figure 7:
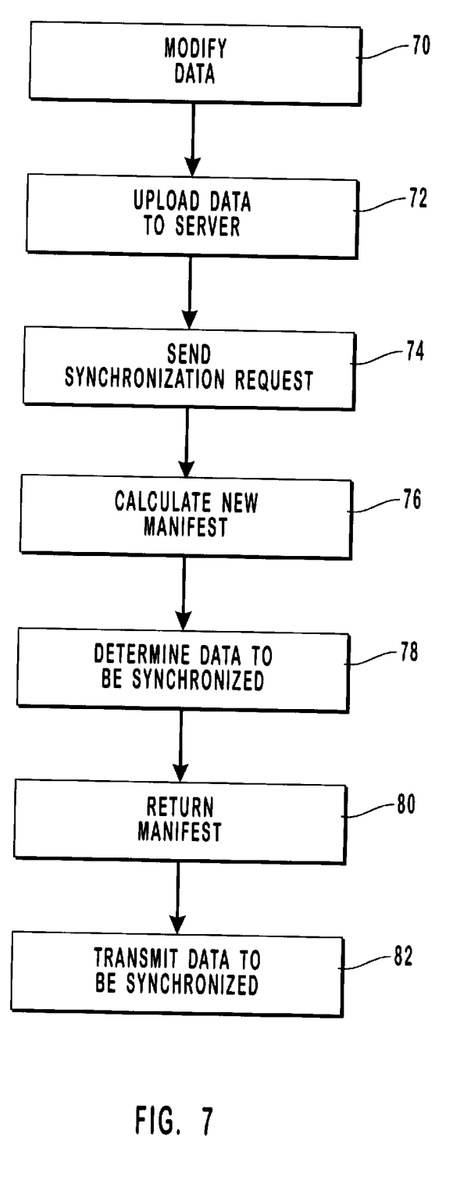
FIG. 7 is a flow diagram in accordance with still another preferred embodiment of the present invention.

As shown in FIG. 7, the client can modify or create new E-mail messages while disconnected from the computer. For example, the client can read, edit, create and delete E-mails while traveling. When the user is once again connected to the server, the client uploads these changes to the server. This process may be independent of the synchronization process that is used to update changes from the server, or part of the synchronization process. For example, the client can upload the changes to the server in a manner normally used with HTTP protocols, such as using a "PUT" command to transfer the new or modified E-mail message to the server. In particular, the client can modify mail message Mail 7 (originally A7) and upload that modification to the server "B." This modified mail message Mail 7 would have the new identifier B2. The client then sends a synchronization request command 72 with the existing manifest A1–A13, B1 to the server. The server receives the synchronization request command and existing manifest, and calculates a new manifest 76 which, in this case, comprises A1–A13, B1–B2. The server then returns the new manifest to the client 80, but no copy of modified mail message Mail 7 (B2) is transferred between the client and the server because it was previously stored at the client and uploaded to the server. Thus, the resources at the client and the server are already symmetric.

Figure 8:
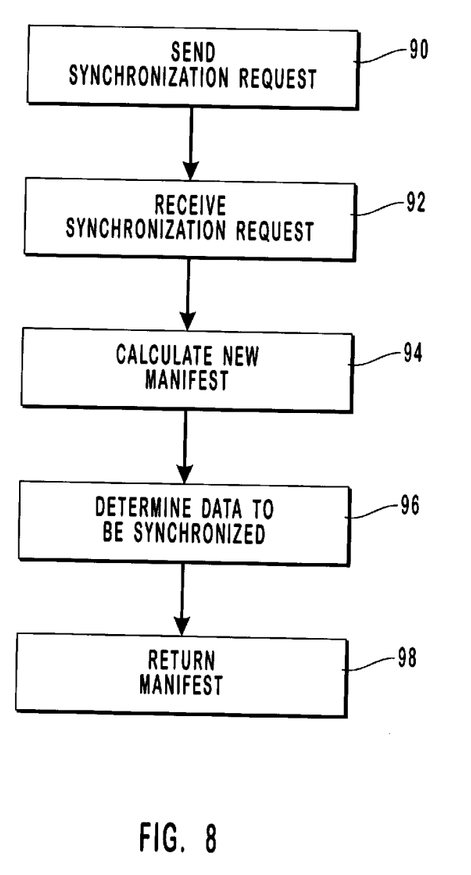
FIG. 8 is a flow diagram in accordance with another preferred embodiment of the present invention.

As shown in FIG. 8, if no changes occurred to the resources either at the client or the server since the last time the resources were synchronized, then the resources remain synchronized. For example, the client sends a synchronization request command with the existing manifest, A1–13, B1–B2, to the server 90. The server receives the synchronization request command and existing manifest 92, and calculates a new manifest, A1–A13, B1–B2, based on the resources at the server 94. Because these manifests are the same, the server determines no synchronization of data is necessary 96 and returns the same manifest to the client 90.

Figure 9:
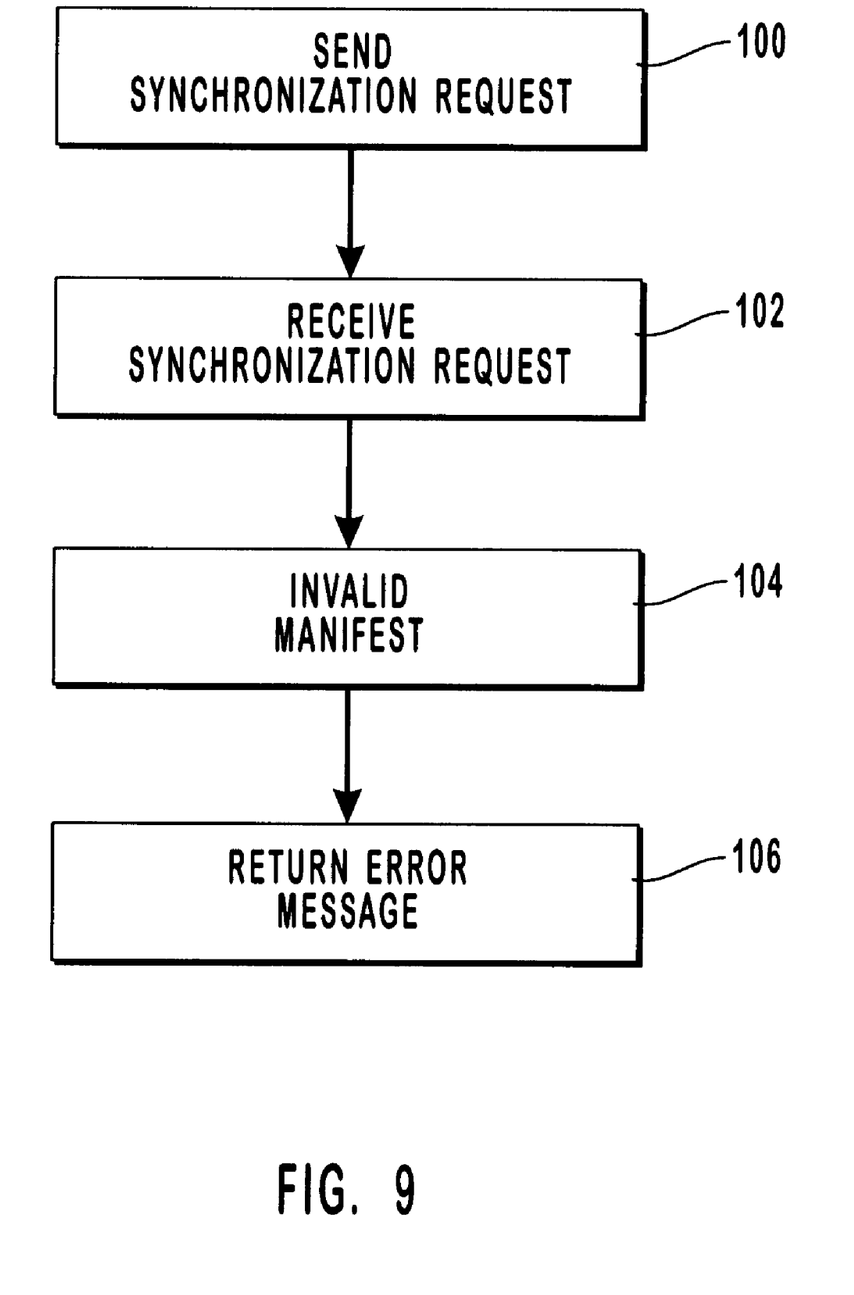
FIG. 9 is a flow diagram in accordance with another preferred embodiment of the present invention.

The server can also determine if an invalid manifest is received. As shown in FIG. 9, the client sends a synchronization request command with a manifest to the server 100. The server receives the synchronization request command and manifest 102, but the server is unable to recognize or process the manifest 1047 for reasons such as lapse of an extended time period, update or modification of the software, etc. The server then returns an error message to the client indicating that an invalid manifest was sent to the server 106.

In another preferred embodiment, the identifiers or manifests described above could be used in conjunction with one or more resource tags that are unique identifiers for a specific version of a resource. Thus, a resource tag identifies a single resource at a specific time. In contrast, the manifest includes a list of all the resources at a given time. Therefore, the manifests and identifiers may be used in conjunction with one or more resource tags to identify particular changes in the resources. Of course, the manifests or identifiers could also include other information and data, and the use of resource tags is not required. Resource tags are described in more detail in co-pending application entitled Method, Data Structure, and Computer Program Product For Identifying A Network Resource, filed on Oct. 4, 1999, U.S. patent application Ser. No. 09/412,071, and assigned to the same assignee as the present application now U.S. Pat. No. 6,578,069. This pending application is hereby incorporated by reference it its entirety.

Another example in which synchronizing two or more copies of data may be applicable is a calendar or scheduling program such as Microsoft Outlook. In Microsoft Outlook, a meeting can be scheduled for a given time and one or more reminders can be sent out before the meeting to remind the user of the meeting. For example, a meeting could be scheduled for 11:00 a.m. and a reminder could be set for 10:30 a.m. to remind the user of the upcoming meeting. If the user is using his or her lap top computes and not connected to the network at 10:30 a.m. that morning, he or she will receive the reminder of the 10:30 a.m. meeting and he or she, for example, can acknowledge or dismiss the reminder on the lap top computer. If the user then connects to the network or server, the server would not know that the client has previously acknowledged the meeting reminder if the data between the client and the server has not been synchronized. Thus, the server may attempt to send the client the reminder again about the 11:00 a.m. meeting, even though the client has already acknowledged the meeting. Because the client and server have different information, this is referred to as a conflict. The server, for example, may resole this conflict by recognizing that the client has already seen and acknowledged the reminder by presenting this conflict to the user so that the user can resolve this conflict. Conflict resolution is described in more detail in co-pending application entitled Systems and Methods for Detecting and Resolving Resource Conflicts, U.S. patent application Ser. No. 09/412,738, filed Oct. 4, 1999, and assigned to the same assignee as the present invention. This pending application was previously incorporated by reference.

Yet another preferred embodiment is that only a portion of the data between the client and the server is synchronized at one time. Thus, for example, if a large amount of data needs to be synchronized, a portion of that data could be synchronized first and then the remaining portion of the data could be synchronized later. Thus, the client, instead of waiting for all the data to be synchronized, could allow a first portion of the data to be synchronized and use that information while the remaining data is being synchronized. For example, if 300 E-mail messages need to be synchronized, the first 30 E-mails could be immediately synchronized and the remaining 270 E-mails could be synchronized later or while the client is reading the first 30 E-mail messages. These first 30 E-mails could be stored in a cache. It will be understood that the number and grouping of the originally stored or synchronized resources could be determined by any suitable means. For example, the groupings could be determined by rows, columns, date sets, or other pertinent factors. Advantageously, the identifiers described above can be used in conjunction with caching. Therefore, while using the caching feature, full synchronization of the resources is not required. The caching feature is described in more detail in co-pending application entitled Method and System for Supporting Off-Line Mode of Operation and Synchronization, filed Oct. 4, 1999, U.S. patent application Ser. No. 09/412,766, and assigned to the same assignee as the present invention U.S. Pat. No. 6,578,054. This pending application is hereby incorporated by reference in its entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A method of synchronizing two or more copies of data between two or more components, one copy of the data being stored in a first component and another copy of the data being stored in a second component, the method comprising the steps of:

generating a synchronization request, the synchronization request including an identifier which identifies the state of a collection of resources in the first component;

communicating the synchronization request from the first component to the second component;

generating an identifier for the second component which identifies the state of a collection of resources in the second component; and comparing the identifier for the first component with the identifier for the second component to determine if the resources in the second component are generally the same as the resources in the first component.

2. The method of claim 1, wherein if the identifier of the first component is generally the same as the identifier of the second component, then the components are generally synchronized and no copies of the resources are communicated between the components.

3. The method of claim 1, further comprising the step of using the identifiers to form manifests which minimize the processing needed to accomplish the synchronization.

4. The method of claim 1, further comprising the step of using the identifiers to determine which of the resources in the collections of the resources need to be synchronized.

5. The method of claim 1, wherein each identifier includes a first portion and a second portion, the first portion including a source identification and the second portion including a change number.

6. The method of claim 1, wherein each identifier is opaque to the first component.

7. The method of claim 1, wherein only resources that contain one or more incremental changes are synchronized and all other unchanged resources are not synchronized.

8. A method of synchronizing two or more copies of data, one copy of the data being stored on a first machine and another copy of the data being stored on a second machine; the method comprising:

generating a synchronization request at the first machine, the synchronization request including a first identifier that indicates the state of a collection of data at the first machine;

communicating the synchronization request to the second machine;

comparing the first identifier with a second identifier that indicates the state of a collection of data at the second machine to determine incremental changes between the data stored on the first machine and the data stored on the second machine; and transmitting only the incremental changes in the data between the first machine and the second machine so that the copies of the data are synchronized.

9. The method of claim 8, wherein the first machine is a client machine and the second machine is server machine.

10. The method of claim 8, wherein the identifier includes a first portion that identifies the source of the data and a second portion that includes a change number.

11. A method of synchronizing two or more copies of data, one copy of the data being stored on a first machine and another copy of the data being stored on a second machine, the method comprising:

transmitting a synchronization request from the first machine to the second machine, the synchronization request including a first manifest indicating the state of the data stored on the first machine;

receiving the synchronization request and the first manifest at the second machine;

comparing the first manifest with a second manifest indicating the state of the data stored on the second machine;

identifying incremental changes in the copies of the data on the first machine and the second machine from the comparison of the first manifest and the second manifest; and communicating copies of the incremental changes between the first and second machines such that the copies of the data are synchronized.

12. The method of claim 11, further comprising transmitting the second manifest from the second machine to the first machine after the data is synchronized.

13. The method of claim 11, wherein only the synchronization request incremental changes in the data, first manifest and second manifest are communicated between the first machine and the second machine.

14. The method of claim 11, wherein the first manifest and the second manifest include one or more identifiers that identify individual elements in the data.

15. The method of claim 11, wherein the identifiers are opaque to the first machine.

16. The method of claim 11, wherein the first and second manifests are opaque to the first machine.

17. The method of claim 11, wherein the first manifest is empty during an initial synchronization request.

18. A method of synchronizing two or more copies of data, one copy of the data being stored on a first machine and another copy of the data being stored on a second machine; the method comprising the steps of:

communicating a synchronization request from the first machine to the second machine;

comparing a first identifier that represents data stored on the first machine with a second identifier that represents data stored on the second machine to determine if the data needs to be synchronized; and communicating only the data the needs to be synchronized from the second machine to the first machine.

19. The method of claim 18, further comprising the step of communicating the first identifier from the first machine to the second machine before comparing the first and second identifiers, and communicating the second identifier to the first machine after comparing the first and second identifiers.

20. A method of synchronizing a second set of data with a first set of data that has had incremental changes made thereto, the incremental changes being made only to the first set of data and not the second set of data, the method comprising the steps of:

comparing a first manifest that indicates a current state of the first set of data with a second manifest that indicates a current state of the second set of data;

determining the incremental changes in the first set of data that need to be synchronized with the second set of data based on the comparison of the first manifest and the second manifest; and communicating only those incremental changes in the first set of data with the second set of data so that the first set of data and the second set of data are synchronized.

21. The method of claim 20, wherein the first manifest and the second manifest comprise a list of one or more tokens, each of the tokens representing the current state of an individual element in the first set of data or the second set of data.

22. A computer-readable medium having computer-executable instructions for performing steps comprising:

communicating a synchronization request from a first machine to a second machine;

receiving the synchronization request at the second machine;

calculating a manifest that indicates the current state of a collection of resources in the second machine;

comparing the manifest for the second machine with a manifest for the first machine, the manifest for the first machine indicating the current state of a collection of resources in the first machine;

identifying incremental differences between the collection of the resources in the first machine and the second machine based upon the differences between the manifests; and communicating the incremental differences in the collection of resources between the second machine and the first machine so that the collection of resources in the first machine is synchronized with the collection of resources in the second machine.

23. The computer-readable medium of claim 22 having further computer-executable instructions for performing the step of communicating only those resources stored in the first machine with the second machine that are necessary to synchronize the collection of resources between the first machine and the second machine.

24. The computer-readable medium of claim 22 having further computer executable instructions for performing the step of communicating the manifest from the second machine to the first machine after the collection of resources is synchronized.

25. A computer-readable medium having computer-executable instructions for performing steps comprising:

communicating a synchronization request from a first machine to a second machine, the synchronization request including a manifest indicating the current state of a collection of resources stored at the first machine;

calculating a manifest indicating the current state of a collection of resources stored at the second machine;

comparing the manifest for the first machine with the manifest for the second machine;

determining the resources that need to be copied from the first machine and the second machine based on the comparison of the manifests; and communicating only those resources which need to be synchronized between the first machine and the second machine.

26. The computer-readable medium of claim 25 having further computer-executable instructions for performing the step of communicating the newly calculated manifest from the second machine to the first machine.

27. The computer-readable medium of claim 25 having further computer-executable instructions for performing the step of returning an error message to the first machine if the manifest indicating the state of the collection of resources in the first machine is invalid.

28. A method of synchronizing resources between a client machine and a server machine, wherein only resources that contain incremental changes are synchronized and resources than are unchanged are not synchronized, the method comprising the steps of:

connecting the client machine to the server to allow communication between the client machine and the server machine;

copying appropriate resources from the server machine to the client machine;

disconnecting the client machine from the server machine;

reconnecting the client machine to the server machine; and synchronizing only the incremental changes to the resources between the client machine and the server machine.

29. The method of claim 28, further comprising the step of communicating a first identifier from the client to the server, the first identifier indicating the state of the resources in the client.

30. The method of claim 28, further comprising the steps of calculating a second identifier that indicates the state of resources at the server, and comparing the first identifier with the second identifier to determine the incremental changes to the resources.

31. The method of claim 28, wherein the first identifier is opaque to the client.

32. The method of claim 28, wherein the first identifier and the second identifier each contain a first portion and a second portion, the first portion including a source identification and the second portion including a change number.

33. The method of claim 28, wherein the change number is changed each time there is a change to the corresponding resource.

34. The method of claim 28, wherein the identifier is unique to each resource.

35. The method of claim 28, wherein the first portion of the identifier identifies a particular server.

36. A method of synchronizing a second copy of data with a first copy of the data, the first copy of the data including incremental changes that have not been incorporated into the second copy of the data, the method comprising:

calculating a first identifier for the first copy of the data, the first identifier indicating the contents of the first copy of the data;

calculating a second identifier for the second copy of the data, the second identifier indicating the contents of the second copy of the data;

comparing the first identifier and the second identifier for controlling transfer of the incremental changes from the first copy of the data to the second copy of the data; and synchronizing the incremental changes from the first copy of the data to the second copy of the data.

37. A computer-readable medium having computer-executable instructions for performing steps comprising:

means for identifying the contents of a first collection of resources;

means for identifying the contents of a second collection of resources;

means for comparing the contents of the second collection of resources with the first collection of resources to determine incremental changes between the first and second collection of resources; and synchronizing the incremental changes between the first and second collection of resources.

38. A system for synchronizing a second copy of data located in second component with a first copy of the data located in a first component, the first copy of the data including incremental changes that have not been incorporated into the second copy of the data, the system comprising:

a data transferring system comprising:

means for identifying the contents of a first collection of resources;

means for identifying the contents of a second collection of resources; and means for comparing the contents of the second collection of resources with the first collection of resources to determine incremental changes between the first and second collection of resources; and means for synchronizing the incremental changes between the first and second collection of resources.

* * * * *